(12) United States Patent
Cornelissen et al.

(10) Patent No.: US 10,775,635 B2
(45) Date of Patent: Sep. 15, 2020

(54) COLOR MIXING IN LASER-BASED LIGHT SOURCE

(71) Applicant: SIGNIFY HOLDING B.V., Eindhoven (NL)

(72) Inventors: Hugo Johan Cornelissen, Escharen (NL); Olexandr Valentynovych Vdovin, Maarheeze (NL); Evgeni Arkad'Evich Patent, Eindhoven (NL); Daniel Anton Benoy, Geldrop (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/613,393

(22) PCT Filed: May 14, 2018

(86) PCT No.: PCT/EP2018/062351
§ 371 (c)(1),
(2) Date: Nov. 13, 2019

(87) PCT Pub. No.: WO2018/210735
PCT Pub. Date: Nov. 22, 2018

(65) Prior Publication Data
US 2020/0209633 A1    Jul. 2, 2020

(30) Foreign Application Priority Data

May 16, 2017    (EP) ..................................... 17171208

(51) Int. Cl.
*F21S 41/14*    (2018.01)
*F21K 9/64*    (2016.01)
(Continued)

(52) U.S. Cl.
CPC ...... *G02B 27/0916* (2013.01); *G02B 19/0052* (2013.01); *G02B 27/0994* (2013.01); *G03B 21/204* (2013.01); *G03B 21/208* (2013.01)

(58) Field of Classification Search
CPC ............ G02B 27/0916; G02B 27/0994; G02B 19/0052; G03B 21/208; G03B 21/204
See application file for complete search history.

(56) References Cited

U.S. PATENT DOCUMENTS

2009/0000612 A1* 1/2009 Hines ...................... F24S 23/74
126/683
2009/0040598 A1   2/2009 Ito
(Continued)

FOREIGN PATENT DOCUMENTS

CN    105652572 A    6/2016
CN    205301794 U    6/2016
(Continued)

*Primary Examiner* — Tracie Y Green
(74) *Attorney, Agent, or Firm* — Daniel J. Piotrowski (57) ABSTRACT

The invention provides a lighting device (1) lighting device (10) comprising: (I) a first light source (110) configured to provide first light source light (101); (II) a luminescent material (200) configured to convert at least part of the first light source light (101) into luminescent material light (201); (III) a beam shaping optical element (300) having a light entrance side (341) and a light exit side (342), and a wall (347) bridging a distance between the light entrance side (341) and the light exit side (342), wherein at least part of the wall (347) is reflective for the luminescent material light (201), wherein the beam shaping optical element (300) is configured to receive at least part of the luminescent material light (201) at the light entrance side (341) and to provide beam shaped luminescent material light (201) at the light exit side (342); (IV) an elongated light transmissive body (100) having a first face (141) and a second face (142) defining a length (L) of the light transmissive body (100), (Continued)

and having one or more side faces (147) bridging the length (L) between the first face (141) and the second face (142), the light transmissive body (100) comprising a radiation input face (111) and a first radiation exit window (112), wherein the first face (141) comprises the radiation input face (111) and wherein the second face (142) comprises the first radiation exit window (112), wherein the radiation input face (111) is configured to receive at least part of the beam shaped light luminescent material light (201); (V) a second light source (120) configured to provide second light source light (121); wherein the elongated light transmissive body (100) is configured to receive at least part of the second light source light (121) via one or more of (i) incoupling of the second light source light (121) via the wall (347) of the beam shaping optical element (300), (ii) incoupling of the second light source light (121) via part of the first face (141) of the elongated light transmissive body (100), and (iii) incoupling of the second light source light (121) via part of the of the one or more side faces (147) of the elongated light transmissive body (100).

15 Claims, 4 Drawing Sheets

(51) Int. Cl.
  *G02B 27/09* (2006.01)
  *G03B 21/20* (2006.01)
  *G02B 19/00* (2006.01)

(56) References Cited

U.S. PATENT DOCUMENTS

| | | | |
|---|---|---|---|
| 2013/0100644 A1* | 4/2013 | Hu | F21V 9/32 362/84 |
| 2014/0028983 A1* | 1/2014 | Fujita | G03B 21/2066 353/30 |
| 2014/0240677 A1 | 8/2014 | Hu et al. | |
| 2015/0110440 A1* | 4/2015 | Bodan | H01L 31/1085 385/14 |
| 2020/0041885 A1* | 2/2020 | Peeters | F21S 41/19 |
| 2020/0088927 A1* | 3/2020 | Denissen | G02B 6/0068 |

FOREIGN PATENT DOCUMENTS

| | | |
|---|---|---|
| WO | 2006054203 A1 | 5/2006 |
| WO | 2007082021 A2 | 7/2007 |
| WO | 2013140961 A1 | 9/2013 |
| WO | 2015113979 A1 | 8/2015 |
| WO | 2016162233 A1 | 10/2016 |
| WO | 2016188744 A1 | 12/2016 |

\* cited by examiner

COLOR MIXING IN LASER-BASED LIGHT SOURCE

CROSS-REFERENCE TO PRIOR APPLICATIONS

This application is the U.S. National Phase application under 35 U.S.C. § 371 of International Application No. PCT/EP2018/062351, filed on May 14, 2018, which claims the benefit of European Patent Application No. 17171208.6, filed on May 16, 2017. These applications are hereby incorporated by reference herein.

FIELD OF THE INVENTION

The invention relates to a lighting device, such as for use in a projector or for use in spot lighting or stage lighting.

BACKGROUND OF THE INVENTION

Light combining devices are known in the art. US 2014/0240677, for instance, describes a light source comprising a light combining device for guiding incident light from a first light emitting source and incident light from a second light emitting source with different incident directions to combine two paths of incident light into one path of emission light emitted from a first optical path. The light combining device comprises a guide part, for guiding light from the second light emitting source to converge into the first optical path, and hindering a part of light from the first light emitting source from entering the first optical path, the luminous flux of the hindered part of the light being less than the luminous flux of light from the first light emitting source entering the first optical path. This light source can effectively reduce the cost and achieve a better heat dissipation effect and is especially suitable for a projection device.

WO2007/082021A2 discloses an optical manifold for combining a plurality of blue LEDs outputs to illuminate a phosphor for a single, substantially homogeneous output for white light. Two blue LEDs feed each a respective compound parabolic concentrator, and the blue light is converted by a green and yellow phosphor, respectively. The converted light is fed to two respective angle-rotator pair that feed an output mixing rod. Light of a red LED is mixed with the light from the two phosphors.

WO2015/113979A1 discloses a light emitting device comprising a first light source, a light guide made of a luminescent material and comprising a light input surface and a light exit surface wherein the light guide is adapted for receiving light from the first light and converting at least a part of the first light to second light, guiding the second light to the light exit surface and coupling the second light out of the light exit surface. The light emitting device further comprises a phosphor element arranged adjacent to a further surface of the light guide and a reflective element arranged adjacent the phosphor element. The phosphor element is adapted for converting light incident from the light guide to third light, and the light guide is furthermore adapted for receiving the third light, guiding the third light to the light exit surface and coupling the third light out of the light exit surface.

WO2016/162233A1 discloses a lighting device configured to generate lighting device light, wherein the lighting device light includes an emission band in the visible part of the spectrum which represents at least 80% of the total power of the lighting device light in the visible part of the spectrum, wherein the emission band has a full width half maximum of at maximum 60 nm, and wherein the emission band has a peak maximum, wherein said emission band comprises luminescent material light, wherein the lighting device comprises a solid state-based light source, configured to generate light source light having a peak maximum, and a luminescent material, configured to convert at least part of the light source light into said luminescent material light.

SUMMARY OF THE INVENTION

For lighting applications that need a high luminance light source, laser-based sources are being developed. Examples of application areas are e.g. automotive headlights, digital projection, and spotlights for retail, hospitality and entertainment.

One may use laser-based systems, wherein e.g. light from a blue solid-state laser is focused onto a ceramic phosphor that partially or fully converts the laser light to longer wavelengths. The resulting high-brightness source can then projected by an optical system of lenses and mirrors.

In order to achieve a high quality of light it may be desirable to set the color temperature and color rendering index of the light to the desired values. For laser based light sources, concepts with either full or partial conversion of blue excitation in a phosphor can be used. In the latter case, the color tuning or phosphor binning to reach the target color point is more complex, therefore configurations with full conversion might be preferred. But then it is needed to add light of other wavelengths, e.g. additional blue or red. By adding blue light the color temperature can be increased, and additional red light might be required to increase the color rendering index.

In such solution, dichroic filters may be used but these require collimated light and relatively large and complex optics, bringing relatively high costs. In some cases, a dichroic filter cannot be applied at all, for instance when one wants to add blue light to a spectrum that already has some content of blue light. In such a case, a dichroic filter cannot discriminate between the phosphor light and the additional light.

Hence, there is a need for a more simple and more compact and more versatile optical configuration that enables mixing of a high luminance phosphor converted light source with laser sources of arbitrary wavelength to improve the quality of the generated light.

Hence, it is an aspect of the invention to provide an alternative lighting device, which preferably further at least partly obviates one or more of above-described drawbacks and/or which may have a relatively higher efficiency and/or may essentially be less complex than other possible solutions. The present invention may have as object to overcome or ameliorate at least one of the disadvantages of the prior art, or to provide a useful alternative.

Herein, light mixing arrangements are described that do not (necessarily) require dichroic filters and accompanying complex optics, but make use of a mixing rod and optionally a coupling prism. Complexity and cost can thereby substantially be reduced. In embodiments, a first light source is a phosphor converted high luminance source with a certain etendue. An additional source, or additional sources, is a laser source with a smaller etendue. Instead of collimating the light from the first source to a parallel beam, and subsequently using a dichroic filter to mix it with a parallelized beam from the additional source, the light of both sources is in embodiments sent into a mixing rod, which in specific embodiments some special measures:

(a) the entrance of the mixing rod is slightly larger than the first (phosphor converted) light source requires, to accommodate the input of the additional (laser) source; (and/)or
(b) the entrance of the mixing rod has the size that the first (phosphor converted) light source requires but an additional small mixing rod is fused to the main mixing rod that allows the additional (laser) light to enter; (and/)or
(c) the entrance of the mixing rod has the size that the first (phosphor converted) light source requires but an additional small coupling prism is fused to the main mixing rod that allows the additional (laser) light to enter; (and/)or
(d) the laser light is entered via the wall of the dielectric compound parabolic concentrator (CPC) that makes part of the phosphor converted source.

Hence, the invention provides a lighting device ("device") comprising: (I) a first light source configured to provide first light source light (having a first spectral distribution); (II) a luminescent material configured to convert at least part of the first light source light into luminescent material light (having a luminescent material spectral distribution); (III) a beam shaping optical element (herein sometimes also indicated as "collimator") having a light entrance side and a light exit side, and a wall bridging a distance between the light entrance side and the light exit side, wherein at least part of the wall is reflective for the luminescent material light, wherein the beam shaping optical element is configured to receive at least part of the luminescent material light at the light entrance side and to provide beam shaped luminescent material light at the light exit side; (IV) an elongated light transmissive body ("body" or "elongated body"; herein sometimes also simply indicated as "rod", which is one of the possible embodiments) having a first face and a second face defining a length (L) of the light transmissive body, and having one or more side faces bridging the length (L) between the first face and the second face, the light transmissive body comprising a radiation input face and a first radiation exit window, wherein the first face comprises the radiation input face and wherein the second face comprises the first radiation exit window, wherein the radiation input face is configured to receive at least part of the beam shaped light luminescent material light; and (IV) a second light source configured to provide second light source light (having a second spectral distribution), wherein the second light source comprises a laser light source; wherein the elongated light transmissive body is configure to receive at least part of the second light source light via one or more of (i) incoupling of the second light source light via the wall of the beam shaping optical element, (ii) incoupling of the second light source light via part of the first face of the elongated light transmissive body, and (iii) incoupling of the second light source light via part of the of the one or more side faces of the elongated light transmissive body. The optical axis of the first light source light, the optical axis of the beam shaping element, the optical axis of the of the second light source light, and the body axis of the beam shaping element being are being essentially parallel to each other. Hence, the lighting device is especially configured to provide lighting device light emanating from the first radiation exit window, wherein the lighting device light comprises one or more of the at least part of the luminescent material light and at least part of the second light source light. Optionally, the lighting device light may also comprise (some) unconverted first light source light.

With such device, it is possible to efficiently mix light having different spectral distributions (i.e. the spectral distribution of the luminescent material light (herein also indicated as "luminescent material spectral distribution") and the spectral distribution of the second light source light (herein also indicated as "second spectral distribution"). Yet further, it is possible to provide mixed light without complicated optics. Yet further, in embodiments it is possible to essentially maintain the etendue of the collimator. Further, it is possible to provide high intensity light.

As indicated above, the device comprises a first light source configured to provide first light source light (having a first spectral distribution). Especially, the first light source comprises a solid state light source, even more especially a solid state laser light source. The term "light source" may also refer to a plurality of light sources. The first light source is especially configured to provide one or more of UV and blue radiation. In specific embodiments, the first light source is configured to provide blue radiation. However, in other embodiments the light source may also be configured to provide light of another color, such as green or yellow.

Further, the device comprises a luminescent material. The luminescent material can essentially be any luminescent material, though in view of the possible intensities, the luminescent material may especially be an inorganic luminescent material. Examples of possible luminescent materials are further described below (though others may also be possible). The luminescent material is configured to convert at least part of the first light source light into luminescent material light (having a luminescent material spectral distribution). The luminescent material in general has an emission at larger wavelengths than the first light source light (Stokes shift) ("down-conversion"). Further, especially the luminescent material is configured such, such as in terms of layer thickness and activator concentration that at least 80%, such as at least 90%, like at least 95% of all first light source light is absorbed (of which part is converted into luminescent material light ("conversion"). Especially, the luminescent material is configured to luminesce in one or more of the green, yellow, orange, and red spectral range.

Further, the device comprises a beam shaping optical element (herein sometimes also indicated as "collimator"). The beam shaping element is configured to collimate at least part of the luminescent material light. The luminescent material light may essentially be diffusely distributed. With the beam shaping element, especially a collimator, the luminescent material is shaped into a beam. The collimator receives at an entrance side the luminescent material and collimated luminescent material light may escape from the light exit side. The wall between these two sides or windows is essentially reflective, especially for the luminescent material light. For instance, the wall (i.e. the internal wall) may have a metallic coating, such as an aluminum or silver coating. The collimator may in embodiments be hollow; in other embodiments, however, the collimator may be a piece of light transmissive material.

Hence, in embodiments the beam shaping element may have a light entrance side and a light exit side, and a wall bridging a distance (such as a "collimator length") between the light entrance side and the light exit side. As indicated above, at least part of the wall is reflective for the luminescent material light. Thus, especially the beam shaping optical element is configured to receive at least part of the luminescent material light at the light entrance side and to provide beam shaped luminescent material light at the light exit side.

The collimator may have a round cross-section, or a square cross-section, or a rectangular cross-section, or a hexagonal cross-section, or a polygonal cross-section, etc. The cross-section is especially the cross-section perpendicular to an optical axis of the collimator. In specific embodiments, the beam shaping optical element comprises a compound parabolic concentrator. In yet further embodiments, the beam shaping optical element comprises an adapted compound parabolic concentrator, i.e. an essentially compound parabolic concentrator shaped concentrator. Especially, the collimator may have an output angle selected from the range of about 20-40°. The compound parabolic concentrator may in embodiments have an (essentially) circular cross-section (over at least part of its length). In other embodiments the compound parabolic concentrator may in embodiments have an (essentially) square cross-section (over at least part of its length), such as a four-sided CPC. Other embodiments may be possible as well.

The beam shaped light is then provided to the elongated transmissive body, either directly or indirectly. For instance, the collimator may be in physical contact with the body, when the collimator is a solid body.

The elongated light transmissive body is configured to allow entrance of light at one side of the body and emission of at least part of that light at another (opposite side) of the body. Hence, the body is especially transparent to at least part of the luminescent material light. For instance, for one or more wavelengths of the luminescent material light, the transmission can be at least 90%. In embodiments, the elongated light transmissive body comprises one or more of a polymeric material, a ceramic material, a glass material, and a single crystalline material. In specific embodiments, the elongated light transmissive body essentially consists one or more of a polymeric material, a ceramic material, a glass material, and a single crystalline material.

The light transmissive material may comprise one or more materials selected from the group consisting of a transmissive organic material, such as selected from the group consisting of PE (polyethylene), PP (polypropylene), PEN (polyethylene napthalate), PC (polycarbonate), polymethylacrylate (PMA), polymethylmethacrylate (PMMA) (Plexiglas or Perspex), cellulose acetate butyrate (CAB), silicone, polyvinylchloride (PVC), polyethylene terephthalate (PET), including in an embodiment (PETG) (glycol modified polyethylene terephthalate), PDMS (polydimethylsiloxane), and COC (cyclo olefin copolymer). Especially, the light transmissive material may comprise an aromatic polyester, or a copolymer thereof, such as e.g. polycarbonate (PC), poly (methyl)methacrylate (P(M)MA), polyglycolide or polyglycolic acid (PGA), polylactic acid (PLA), polycaprolactone (PCL), polyethylene adipate (PEA), polyhydroxy alkanoate (PHA), polyhydroxy butyrate (PHB), poly(3-hydroxybutyrate-co-3-hydroxyvalerate) (PHBV), polyethylene terephthalate (PET), polybutylene terephthalate (PBT), polytrimethylene terephthalate (PTT), polyethylene naphthalate (PEN); especially, the light transmissive material may comprise polyethylene terephthalate (PET). Hence, the light transmissive material is especially a polymeric light transmissive material. However, in other embodiments the light transmissive material may comprise an inorganic material. Especially, the inorganic light transmissive material may be selected from the group consisting of glasses, (fused) quartz, transmissive ceramic materials, and silicones. Also hybrid materials, comprising both inorganic and organic parts may be applied. Especially, the light transmissive material comprises one or more of PMMA, transparent PC, or glass.

In embodiments, the body has a first face and a second face defining a length (L) of the light transmissive body, and having one or more side faces bridging the length (L) between the first face and the second face. Further, the light transmissive body comprising a radiation input face and a first radiation exit window. The first face comprises the radiation input face; especially, the radiation input face is the first face. The second face comprises the first radiation exit window; especially, the first radiation exit window is the second face.

Especially, the elongated light transmissive body has an aspect ratio of at least 2, such as at least 5, like at least 10. With an aspect ratio of at least 5, such as at least 10, efficient color mixing may be obtained. In embodiments, the body has a square or rectangular cross-section. In further embodiments, the body has a hexagonal cross-section, or a polygonal cross-section. In yet further embodiments, the body has a round cross-section with one or more elongated flat parts, for instance like a cubic or rectangular cross-section where 1-3 faces are curved (around an axis of elongation). Specific embodiments are further elucidated below. The radiation input face is configured to receive at least part of the beam shaped light luminescent material light. The luminescent material propagates through the body. Scattering and absorption may be low, and due to TIR a substantial part of the luminescent material light can reach the radiation exit window.

Yet further, the device comprises a second light source configured to provide second light source light having a second spectral distribution.

Especially, the second light source comprises a solid state light source, even more especially a solid state laser light source. Hence, in embodiments the second light source comprises a laser light source. The term "light source" may also refer to a plurality of light sources. The second light source is especially configured to provide one or more of blue radiation, green, yellow, orange, and red radiation. In specific embodiments, the second light source is configured to provide blue radiation. However, in other embodiments the light source may also be configured to provide light of another color, such as green, yellow, orange or red. The second light source light may in specific embodiments be applied to provide together with the luminescent material light white light. However, the second light source light may also be used to tune the color point of already essentially white light (for instance when the first light source light and luminescent material light together provide white light). Hence, the second spectral distribution will also be different from the luminescent material spectral distribution but may in embodiments be essentially identical to the first spectral distribution. However, in other embodiments the first spectral distribution and the second spectral distribution may be different. Note that also a plurality of identical, but also a plurality of different, second light sources may be applied. In this way, not only intensity can be increased, but also the color point can further be tuned.

The light of the second light source has to be admixed with the light of the luminescent material. As indicated above, (downstream) optics may be used, but may complicate the construction. Further, such optics may have impact on the etendue.

Therefore, the invention provides the solution that the elongated light transmissive body (and the second light source, and optionally the beam shaping element) is (are) configure to receive (or let the elongated light transmissive body receive) at least part of the second light source light via one or more of (i) incoupling of the second light source light via the wall of the beam shaping optical element, (ii) incoupling of the second light source light via part of the first face of the elongated light transmissive body, and (iii)

incoupling of the second light source light via part of the of the one or more side faces of the elongated light transmissive body.

In this way, downstream of the elongated body, after mixing of the second light source light and the luminescent material light in the elongated body, lighting device light emanates from the first radiation exit window. This lighting device light comprises one or more of the at least part of the luminescent material light and at least part of the second light source light. Optionally, the lighting device light may thus also comprise (some) unconverted first light source light.

The light of the first light source and/or the second light source may be provided via optical fibers. This may facilitate an easy construction. It may also allow the end of the fiber providing the light source light with some Lambertian character. For instance, this may be provided with some surface roughening or micro-optical structures at the end ("tip") of the fiber. The optical coupling between the (first and/or second light source) and one of the herein indicated optical elements may further be reached with an intermediate optical element. Such intermediate optical element like a positive or negative lens or curved reflector or diffraction grating element may (also) provide some broadening of the beam.

Therefore, in embodiments the lighting device may further comprise an optical fiber, configured to receive at one fiber side the first light source light, and wherein a second side of the fiber (or the "tip") is optically coupled to the luminescent material, optionally via an intermediate optical element. Likewise, this may be used for the second light source, though the optical coupling may then not only be with the beam shaping element, but alternatively (or additionally) with the elongated body.

In embodiments, the optical coupling of the second light source with the elongated body is essentially direct (and not via the beam shaping element).

In specific embodiments, the first face of the elongated body may be larger than necessary for receiving the beam shaped luminescent material light, such as larger than the light exit side of the beam shaping element. In such instance, the second light source light may be received by the remaining part of the first face. Therefore, in specific embodiments the first face comprises a first area (A1) being larger than a second area (A2) of the light exit side of the beam shaping optical element, thereby defining a remaining area (A3) of the first face, and wherein the second light source is optically coupled to the remaining area (A3) for incoupling of the second light source light via part of the first face of the elongated light transmissive body. Especially, A2/A1>0.8, such as at least 0.9 applies. Hence, A3 may be in the range of e.g. 0.1-20% of A1, like 0.1-10% of A1.

In this embodiment, the etendue of the resulting light source is increased by a factor A1/A2.

The above-embodiment may e.g. be used in combination with the elongated light transmissive body having a hexagonal cross-section. The beam-shaping element may e.g. have a square, rectangular or circular cross-section, especially square or rectangular.

In yet a further embodiment, along the elongated body, a second body is arranged over at least part of the length of the elongated body. The second body will in general have an essentially smaller cross-section than the elongated body. For instance, the ratio of the cross-section may be 2 or larger, such as 4 or larger, like 5 or larger, such as in the range of 4-50, like 4-20. This implies that the beam shaping element and the elongated body can be tuned to each other optimally, and the second light source light more or less comes along with the elongated body. As the second elongated body is configured in optical contact with the elongated body, over the entire length light of the second light source may escape to the elongated body. As the second elongated body may essentially be smaller than the elongated body, the light that escapes from the elongated body to the second elongated body may be relatively small, and can of course also be coupled back into the elongated body.

Therefore, in specific embodiments the lighting device further comprising a second elongated light transmissive body having a first face of the second elongated light transmissive body and a second face of the second elongated light transmissive body defining a second length (L2) of the second light transmissive body, and having one or more side faces of the second elongated light transmissive body bridging the second length (L2) between the first face of the second elongated light transmissive body and the second face of the second elongated light transmissive body, wherein the second light transmissive body comprises a radiation input face of the second elongated light transmissive body and a first radiation exit window of the second elongated light transmissive body, wherein the first face of the second elongated light transmissive body comprises the radiation input face of the second elongated light transmissive body and at least one of the one or more side faces of the second elongated light transmissive body comprises the first radiation exit window, wherein the radiation input face of the second elongated light transmissive body is configured to receive at least part of the second light source light, and wherein a first part the at least one of the one or more side faces of the second elongated light transmissive body is optically coupled to one or more side faces of the elongated light transmissive body, for incoupling of the second light source light via part of the first face of the elongated light transmissive body.

The material of the elongated body may be as defined above. In specific embodiments, the elongated body and the second elongated body are of the same material, which may facilitate light coupling between the bodies. Further, the second elongated body may especially have a shape entirely fitting to (at least) one of the side faces of the elongated body. In this way, physical coupling may be possible, i.e. that at least one of the side faces of the second elongated body is in physical contact with the elongated body. The length of the second elongated body may essentially be the same as or may be shorter than the length of the elongated body. Assuming a physical contact, the area of the elongated body that is in contact with the second elongated body may be equal to or smaller than about 25% of the elongated body.

With this solution, there is no impact on the integrity of the elongated body. This may be beneficial for the efficiency of the system.

In this specific embodiment and variants, the first face comprises a first area (A1) which may essentially be identical to a second area (A2) of the light exit side of the beam shaping optical element.

It may be desirable to further facilitate incoupling from the second elongated body into the first elongated body. For instance, a kind of prismatic structure may be comprised by the second elongated body. The shape of the prismatic structure may be such, that incoupling in the elongated body is facilitate. Therefore, in specific embodiments the second elongated light transmissive body may taper over at least part of the second length (L2) for facilitating coupling of the second light source light into the elongated light transmissive body.

Also in this specific embodiment and variants, the first face comprises a first area (A1) which may essentially be identical to a second area (A2) of the light exit side of the beam shaping optical element.

In addition to or instead of providing the second light source light directly to the elongated body at the first face, or via a second elongated body, it may also be possible to provide a kind of bypass via the beam shaping optical element. For instance, there may be a (small) hole in the beam shaping element, different from the opening for the first light source light, through which the second light source light penetrates in the beam shaping element, especially in the collimator. Hence, whereas the optical axis of the beam shaping element may be configured perpendicular to the light entrance side (which may be an opening) and the light exit side (which may also be an opening), the opening for the second light source light may be offset from the optical axis. Therefore, in specific embodiments the wall of the beam shaping optical element comprises an opening for receiving at least part of the second light source light, especially for incoupling of the second light source light via the wall of the beam shaping optical element. Of course, also more than one opening may be available, such as in the case where a plurality of second light sources are applied.

Also in this specific embodiment and variants, the first face comprises a first area (A1) which may essentially be identical to a second area (A2) of the light exit side of the beam shaping optical element.

When the beam shaping optical element is hollow, and comprises e.g. a reflective coating at the inside of the wall, a hole in the wall (such as having a hole area of equal to or less than 10% of the area of the wall at the inside of the beam shaping optical element) may be used to allow entrance of the light of the second light source.

When the beam shaping optical element is a massive body (wherein light may be reflected at the walls of the body), a fiber or other optical element may be coupled to the wall of the massive body. In this way, light may enter the massive body. Also in this case a hole can be made in the wall, and a fiber may e.g. be melted or glued into the massive body.

As indicated above, the second light source light may also be provided via an optical fiber to the beam shaping element, to the first face of the elongated body, or to the second elongated body. Therefore, in specific embodiments the lighting device further comprises a second optical fiber, configured to receive at a first fiber side of the second optical fiber the second light source light, and wherein a second side of the second optical fiber is optically coupled to one or more of (i) the wall of the beam shaping optical element, (ii) the part of the first face of the elongated light transmissive body, and (iii) the part of the of the one or more side faces of the elongated light transmissive body.

The second elongated body is thus especially configured parallel to the elongated body. Further, especially the first face of the second elongated body may be configured close to the first face of the elongated body. In this way, the color mixing may be over a substantial part of the length of the elongated body.

Further, in embodiments the first light source light and the second light source light have optical axis that are essentially parallel. The optical axis of the beam shaping element and of the first light source light may over at least part of their length coincide. The optical axis of the second light source light will especially not coincide over at least part of the length of the optical axis of the first light source light and the optical axis of the beam shaping element, but may be configured parallel thereto.

Above, already some options are indicated for combinations of colors for the first light source light, the luminescent material light, and the second light source light. Especially, the luminescent material is configured to provide one or more of green and yellow luminescent material light, and the second light source is configured to provide one or more of blue and red second light source light. With such embodiments, white light may be generated.

As also indicated above, a plurality of second light sources may be applied. They may be identically, such as solid state light sources, like lasers, from the same bin, but they may also be substantially different, such as e.g. for providing blue light and for providing red light. Hence, in embodiments the lighting device comprises a plurality of second light sources comprising two or more second light sources configured to provide different second spectral distributions, differing with a difference in peak maxima of at least 20 nm. The incoupling of the second light source light may be chosen differently for different second light sources. However, the second light source light of the second light sources may also be coupled in the same way, such as all via openings in the collimator wall.

The invention also provides a lighting system comprising the lighting device as defined herein, wherein the lighting system comprises a spot lighting system or an image projection system. Especially, such lighting system may comprise a plurality of the lighting devices.

Below, some further specific embodiments are described.

The beam shaping optical element may have cross section (perpendicular to an optical axis) with a shape that is the same as the cross-section of the luminescent body, perpendicular to the longest body axis (which body axis is the axis of symmetry of the body parallel to a radiation input face). For instance, would the latter have a rectangular cross section, the former may also have such rectangular cross section, though the dimension may be different. Further, the dimension of the beam shaping optical element may vary over its length (as it may have a beam shaping function). As indicated above, in specific embodiments the light exit side of the beam shaping element may especially have the same shape and same dimensions as the first face (more especially the radiation input face) of the elongated light transmissive body.

In embodiments, downstream of the radiation exit window, a further beam shaping element, such as a collimator, and/or other optics may be provided.

The term "optical contact" and similar terms, such as "optically coupled" especially mean that the light escaping a first element may enter a second element with minimal losses (such as Fresnel reflection losses or TIR (total internal reflection) losses) due to refractive index differences of these elements. The losses may be minimized by one or more of the following elements: a direct optical contact between the two optical elements, providing an optical glue between the two optical elements, preferably the optically glue having a refractive index higher that the lowest refractive index of the two individual optical elements, providing the two optical elements in close vicinity (e.g. at a distance much smaller than the wavelength of the light), such that the light will tunnel through the material present between the two optical elements, providing an optically transparent interface material between the two optical elements, preferably the optically transparent interface material having a refractive index higher that the lowest refractive index of the two individual optical elements, the optically transparent interface material might be a liquid or a gel or providing optical Anti Reflective coatings on the surfaces of the two individual optical elements.

Instead of the term "in optical contact" also the term "radiationally coupled" may be used. The elongated body and the beam shaping optical element, especially the indicated "windows", may in embodiments be in physical contact with each other or may in other embodiments in separated from each other with a (thin) layer of optical glue, e.g. having a thickness of less than about 1 mm, preferably less than 100 µm.

As the elongated body is a body and as in general also the beam shaping optical element is a body, the term "window" herein may especially refer to side or a part of a side.

The lighting device may be configured to provide blue, green, yellow, orange, or red light, etc. Further, in specific embodiment, the lighting device may be configured to provide white light. If desired, monochromaticity may be improved using optical filter(s).

In embodiments, the color point of the lighting device light may be tunable when the power of the one or more of the first light source and the second light source are controllable.

The terms "upstream" and "downstream" relate to an arrangement of items or features relative to the propagation of the light from a light generating means (here the especially the light source(s)), wherein relative to a first position within a beam of light from the light generating means, a second position in the beam of light closer to the light generating means is "upstream", and a third position within the beam of light further away from the light generating means is "downstream".

The elongated light transmissive body may e.g. be a ceramic rod or a crystal, such as a single crystal.

The light transmissive body has light guiding or wave guiding properties. Hence, the light transmissive body is herein also indicated as waveguide or light guide. As the light transmissive body is used as light concentrator, the light transmissive body is herein also indicated as light concentrator. The light transmissive body will in general have (some) transmission of visible light in a direction perpendicular to the length of the light transmissive body. The transmission in the visible might be close to 100%.

Herein, the term "visible light" especially relates to light having a wavelength selected from the range of 380-780 nm. The transmission can be determined by providing light at a specific wavelength with a first intensity to the light transmissive body under perpendicular radiation and relating the intensity of the light at that wavelength measured after transmission through the material, to the first intensity of the light provided at that specific wavelength to the material (see also E-208 and E-406 of the CRC Handbook of Chemistry and Physics, 69th edition, 1088-1989).

The light transmissive body may have any shape, such as beam like or rod like, however especially beam like (cuboid like). However, the light transmissive body may also be disk like, etc. The light transmissive body, might be hollow, like a tube, or might be filled with another material, like a tube filled with water or a tube filled with another solid light transmissive medium. The invention is not limited to specific embodiments of shapes, neither is the invention limited to embodiments with a single exit window or outcoupling face. Below, some specific embodiments are described in more detail. Would the light transmissive body have a circular cross-section, then the width and height may be equal (and may be defined as diameter). Especially, however, the light transmissive body has a cuboid like shape, such as a bar like shape, and is further configured to provide a single exit window.

In a specific embodiment, the light transmissive body may especially have an aspect ratio larger than 1, i.e. the length is larger than the width. In general, the light transmissive body is a rod, or bar (beam), or a rectangular plate, though the light transmissive body does not necessarily have a square, rectangular or round cross-section. In general, the light source is configured to irradiate one of the longer faces (side edge), herein indicated as radiation input face, and radiation escapes from a face at a front (front edge), herein indicated as radiation exit window. Especially, in embodiments the solid state light source, or other light source, is not in physical contact with the light transmissive body. Physical contact may lead to undesired outcoupling and thus a reduction in concentrator efficiency. Further, in general the light transmissive body comprises two substantially parallel faces, the radiation input face and opposite thereof the opposite face. These two faces define herein the width of the light transmissive body. In general, the length of these faces defines the length of the light transmissive body. However, as indicated above, and also below, the light transmissive body may have any shape, and may also include combinations of shapes. Especially, the radiation input face has a radiation input face area (A), wherein the radiation exit window has a radiation exit window area (E), and wherein the radiation input face area (A) is at least 1.5 times, even more especially at least two times larger than the radiation exit window area (E), especially at least 5 times larger, such as in the range of 2-50,000, especially 5-5,000 times larger. Hence, especially the elongated light transmissive body comprises a geometrical concentration factor, defined as the ratio of the area of the radiation input faces and the area of the radiation exit window, of at least 1.5, such as at least 2, like at least 5, or much larger (see above). This allows e.g. the use of a plurality of solid state light sources (see also below). For typical applications like in automotive, digital projectors, or high brightness spot light applications, a small but high intense emissive surface is desired. This cannot be obtained with a single LED, but can be obtained with the present lighting device. Especially, the radiation exit window has a radiation exit window area (E) selected from the range of 1-100 mm$^2$. With such dimensions, the emissive surface can be small, whereas nevertheless high intensity may be achieved. As indicated above, the light transmissive body in general has an aspect ratio (of length/width). This allows a small radiation exit surface, but a large radiation input surface, e.g. irradiated with a plurality of solid state light sources. In a specific embodiment, the light transmissive body has a width (W) selected from the range of 0.5-100 mm. The light transmissive body is thus especially an integral body, having the herein indicated faces.

The generally rod shaped or bar shaped light transmissive body can have any cross sectional shape, but in embodiments has a cross section the shape of a square, rectangle, round, oval, triangle, pentagon, or hexagon, even more especially square, rectangle, oval, triangle, pentagon, or hexagon. Generally the ceramic or crystal bodies are cuboid. In specific embodiments, the body may be provided with a different shape than a cuboid, with the light input surface having somewhat the shape of a trapezoid. By doing so, the light flux may be even enhanced, which may be advantageous for some applications. Hence, in some instances (see also above) the term "width" may also refer to diameter, such as in the case of a light transmissive body having a round cross section. Hence, in embodiments the elongated light transmissive body further has a width (W) and a height (H), with especially L>W and L>H. Especially, the first face and the second face define the length, i.e. the distance between these faces is the length of the elongated light transmissive body. These faces may especially be arranged parallel. Further, in a specific embodiment the length (L) is at least 2 cm, such as 4-20 cm.

The light transmissive body as set forth below in embodiments according to the invention may also be folded, bended and/or shaped in the length direction such that the light transmissive body is not a straight, linear bar or rod, but may comprise, for example, a rounded corner in the form of a 90 or 180 degrees bend, a U-shape, a circular or elliptical shape, a loop or a 3-dimensional spiral shape having multiple loops. This provides for a compact light transmissive body of which the total length, along which generally the light is guided, is relatively large, leading to a relatively high lumen output, but can at the same time be arranged into a relatively small space.

Parts of the light transmissive body that are not used as light incoupling area or light exit window may be provided with a reflector.

The one or more reflectors may consist of a metal reflector, such as a thin metal plate or a reflective metal layer deposited on a substrate, such as e.g. glass. The one or more reflectors may consist of an optical transparent body containing optical structure to reflect (part) of the light such as prismatic structures. The one or more reflectors may consist of specular reflectors. The one or more reflectors may contain microstructures, such as prism structures or sawtooth structures, designed to reflect the lightrays towards a desired direction.

The terms "coupling in" and similar terms and "coupling out" and similar terms indicate that light changes from medium (external from the light transmissive body into the light transmissive body, and vice versa, respectively). In general, the light exit window will be a face (or a part of a face), configured (substantially) perpendicular to one or more other faces of the waveguide. In general, the light transmissive body will include one or more body axes (such as a length axis, a width axis or a height axis), with the exit window being configured (substantially) perpendicular to such axis. Hence, in general, the light input face(s) will be configured (substantially) perpendicular to the light exit window. Thus, the radiation exit window is especially configured perpendicular to the one or more radiation input faces. Therefore, especially the face comprising the light exit window does not comprise a light input face.

For further improving efficiency and/or for improving the spectral distribution several optical elements may be included like mirrors, optical filters, additional optics, etc. In specific embodiments, the lighting device may have a mirror configured at the first face configured to reflect light back into the elongated light transmissive body, and/or may have one or more of an optical filter, a (wavelength selective) mirror, a reflective polarizer, light extraction structures, and a collimator configured at the second face. At the second face the mirror may e.g. be a wavelength selective mirror or a mirror including a hole. In the latter embodiment, light may be reflected back into the body but part of the light may escape via the hole. Especially, in embodiments the optical element may be configured at a distance of about 0.01-1 mm, such as 0.1-1 mm from the body.

Downstream of the radiation exit window, optionally an optical filter may be arranged. Such optical filter may be used to remove undesired radiation. For instance, when the lighting device should provide red light, all light other than red may be removed. Hence, in a further embodiment the lighting device further comprises an optical filter configured downstream of the radiation exit window and configured to reduce the relative contribution of undesired light in the converter light (downstream of the radiation exit window). For filtering out light source light, optionally an interference filter may be applied.

In yet a further embodiment, the lighting device further comprises a collimator configured downstream of the radiation exit window (of the highest order luminescent concentrator) and configured to collimate the converter light. Such collimator, like e.g. a CPC (compound parabolic concentrator), may be used to collimate the light escaping from the radiation exit window and to provide a collimated beam of light.

Especially, the light sources are light sources that during operation emit (light source light) at least light at a wavelength selected from the range of 200-490 nm, especially light sources that during operation emit at least light at wavelength selected from the range of 400-490 nm, even more especially in the range of 440-490 nm. This light may partially be used by the luminescent material. Hence, in a specific embodiment, the light source is configured to generate blue light. In a specific embodiment, the light source comprises a solid state light source (such as a LED or laser diode). The term "light source" may also relate to a plurality of light sources, such as e.g. 2-2000, such as 2-500, like 2-100, especially 4-80 (solid state) light sources, though many more light sources may be applied. The term "light source" may also relate to one or more light sources that are tailored to be applied for such light concentrating luminescent concentrators, e.g. one or more LED's having a long elongated radiating surface matching the long elongated light input surfaces of the elongated luminescent concentrator. Hence, the term LED may also refer to a plurality of LEDs. Hence, as indicated herein, the term "solid state light source" may also refer to a plurality of solid state light sources. In an embodiment (see also below), these are substantially identical solid state light sources, i.e. providing substantially identical spectral distributions of the solid state light source radiation. In embodiments, the solid state light sources may be configured to irradiate different faces of the light transmissive body. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB or comparable. Hence, a plurality of semiconductor light sources may be configured on the same substrate. In embodiments, a COB is a multi LED chip configured together as a single lighting module.

Especially herein, the term "light source" refers to a laser light source. In embodiments, the length (L) of the elongated body is selected from the range of 1-100 cm, such as especially 2-50 cm, like at least 3 cm, such as 5-50 cm, like at maximum 30 cm.

Luminescent materials may e.g. comprise YAG:Ce (i.e. $Y_3Al_5O_{12}:Ce^{3+}$) or LuAG ($Lu_3Al_5O_{12}:Ce^{3+}$). 'Red' luminescent materials can be made by doping a YAG-garnet with Gd ("YGdAG"). Blue luminescent materials may be YSO ($Y_2SiO_5:Ce^{3+}$) or similar compounds or BAM ($BaMgAl_{10}O_{17}:Eu^{2+}$) or similar compounds.

Especially, the luminescent material especially comprises an $A_3B_5O_{12}:Ce^{3+}$) luminescent wherein A is especially selected from the group consisting of Sc, Y, Tb, Gd, and Lu (especially at least Y and Gd), wherein B is especially selected from the group consisting of Al and Ga (especially at least Al). More especially, A (essentially) comprises yttrium (Y) and gadolinium (Gd), and B (essentially) comprises aluminum (Al). Such garnet is be doped with cerium (Ce), and optionally with other luminescent species such as praseodymium (Pr).

As indicated above, the element A may especially be selected from the group consisting of yttrium (Y) and gadolinium (Gd). Hence, $A_3B_5O_{12}:Ce^{3+}$) especially refers to $(Y_{1-x}Gd_x)_3B_5O_{12}:Ce^{3+}$) wherein especially x is in the range of 0.1-0.5, even more especially in the range of 0.2-0.4, yet even more especially 0.2-0.35. Hence, A may comprise in the range of 50-90 atom % Y, even more especially at least 60-80 atom % Y, yet even more especially 65-80 atom % of A comprises Y. Further, A comprises thus especially at least 10 atom % Gd, such as in the range of 10-50 atom % Gd, like 20-40 atom %, yet even more especially 20-35 atom % Gd.

Especially, B comprises aluminum (Al), however, B may also partly comprise gallium (Ga) and/or scandium (Sc) and/or indium (In), especially up to about 20% of Al, more especially up to about 10% of Al may be replaced (i.e. the A ions essentially consist of 90 or more mole % of Al and 10 or less mole % of one or more of Ga, Sc and In); B may especially comprise up to about 10% gallium. Therefore, B may comprise at least 90 atom % Al. Hence, $A_3B_5O_{12}:Ce^{3+}$) especially refers to $(Y_{1-x}Gd_x)_3Al_5O_{12}:Ce^{3+}$) wherein especially x is in the range of 0.1-0.5, even more especially in the range of 0.2-0.4.

In another variant, B (especially Al) and O may at least partly be replaced by Si and N. Optionally, up to about 20% of Al—O may be replaced by Si—N, such as up to 10%.

For the concentration of cerium, the indication n mole % Ce indicates that n % of A is replaced by cerium. Hence, $A_3B_5O_{12}:Ce^{3+}$ may also be defined as $(A_{1-n}Ce_n)_3B_5O_{12}$, with n being in the range of 0.001-0.035, such as 0.0015-0.01. Therefore, a garnet essentially comprising Y and mole Ce may in fact refer to $((Y_{1-x}Gd_x)_{1-n}Ce_n)_3B_5O_{12}$, with x and n as defined above.

Instead of cerium doped garnets, or in addition to such garnets, also other luminescent materials may be applied. For instance quantum dots and/or organic dyes may be applied and may optionally be embedded in transmissive matrices like e.g. polymers, like PMMA, or polysiloxanes, etc. etc.

Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as indium phosphide (InP), and copper indium sulfide ($CuInS_2$) and/or silver indium sulfide ($AgInS_2$) can also be used. Quantum dots show very narrow emission band and thus they show saturated colors. Furthermore the emission color can easily be tuned by adapting the size of the quantum dots. Any type of quantum dot known in the art may be used in the present invention. However, it may be preferred for reasons of environmental safety and concern to use cadmium-free quantum dots or at least quantum dots having a very low cadmium content.

Instead of quantum dots or in addition to quantum dots, also other quantum confinement structures may be used. The term "quantum confinement structures" should, in the context of the present application, be understood as e.g. quantum wells, quantum dots, quantum rods, or nano-wires.

Organic phosphors can be used as well. Examples of suitable organic phosphor materials are organic luminescent materials based on perylene derivatives, for example compounds sold under the name Lumogen® by BASF. Examples of suitable compounds include, but are not limited to, Lumogen® Red F305, Lumogen® Orange F240, Lumogen® Yellow F083, and Lumogen® F170.

Several color conversion schemes may be possible. Especially, however, the Stokes shift is relatively small. Especially, the Stokes shift, defined as the difference (in wavelength) between positions of the band maxima of the light source used for pumping and the light which is emitted, is not larger than 100 nm; especially however, the Stokes shift is at least about 10 nm, such as at least about 20 nm. This may especially apply to the light source light to first luminescent material light conversion, but also apply to the second pump radiation to second luminescent material light conversion, etc.

The lighting device may be part of or may be applied in e.g. office lighting systems, household application systems, shop lighting systems, home lighting systems, accent lighting systems, spot lighting systems, theater lighting systems, architectural lighting, fiber-optics application systems, projection systems, self-lit display systems, pixelated display systems, segmented display systems, warning sign systems, medical lighting application systems, indicator sign systems, decorative lighting systems, portable systems, automotive applications, green house lighting systems, horticulture lighting, or LCD backlighting, etc.

In yet a further aspect, the invention provides a projector comprising the lighting device as defined herein. As indicated above, of course the light projector may also include a plurality of such lighting devices.

In yet a further aspect, the invention also provides a lighting system configured to provide lighting system light, the lighting system comprising one or more lighting devices as defined herein. Here, the term "lighting system" may also be used for a (digital) projector. Further, the lighting device may be used for e.g. stage lighting (see further also below), or architectural lighting. Therefore, in embodiments the invention also provides a lighting system as defined herein, wherein the lighting system comprises a digital projector, a stage lighting system or an architectural lighting system. The lighting system may comprise one or more lighting devices as defined herein and optionally one or more second lighting devices configured to provide second lighting device light, wherein the lighting system light comprises (a) one or more of (i) the converter light as defined herein, and optionally (b) second lighting device light. Hence, the invention also provides a lighting system configured to provide visible light, wherein the lighting system comprises at least one lighting device as defined herein. For instance, such lighting system may also comprise one or more (additional) optical elements, like one or more of optical filters, collimators, reflectors, wavelength converters, lens elements, etc. The lighting system may be, for example, a lighting system for use in an automotive application, like a headlight. Hence, the invention also provides an automotive lighting system configured to provide visible light, wherein the automotive lighting system comprises at least one lighting device as defined herein and/or a digital projector system comprising at least one lighting device as defined herein. Especially, the lighting device may be configured (in such applications) to provide red light. The automotive lighting system or digital projector system may also comprise a plurality of the lighting devices as described herein.

Alternatively, the lighting device may be designed to provide high intensity UV radiation, e.g. for 3D printing technologies or UV sterilization applications. Alternatively, the lighting device may be designed to provide a high intensity IR light beam, e.g., to project IR images for (military) training purposes.

The term white light herein, is known to the person skilled in the art. It especially relates to light having a correlated color temperature (CCT) between about 2000 and 20000 K, especially 2700-20000 K, for general lighting especially in the range of about 2700 K and 6500 K, and for backlighting purposes especially in the range of about 7000 K and 20000 K, and especially within about 15 SDCM (standard deviation of color matching) from the BBL (black body locus), especially within about 10 SDCM from the BBL, even more especially within about 5 SDCM from the BBL, such as within about 3 SDCM from the BBL.

The terms "violet light" or "violet emission" especially relates to light having a wavelength in the range of about 380-440 nm. The terms "blue light" or "blue emission" especially relate to light having a wavelength in the range of about 440-490 nm (including some violet and cyan hues). The terms "green light" or "green emission" especially relate to light having a wavelength in the range of about 490-560 nm. The terms "yellow light" or "yellow emission" especially relate to light having a wavelength in the range of about 560-570 nm. The terms "orange light" or "orange emission" especially relate to light having a wavelength in the range of about 570-600. The terms "red light" or "red emission" especially relate to light having a wavelength in the range of about 600-780 nm. The term "pink light" or "pink emission" refers to light having a blue and a red component. The terms "visible", "visible light" or "visible emission" refer to light having a wavelength in the range of 380-780 nm. The term UV light may be UV-A (315-400 nm); UV-B (280-315 nm) or UV-C (200-280 nm). The term IR light may be light in the range above 780 nm. The term "white light" may in embodiments refer to light consisting of particular spectral compositions of wavelengths in the range between 380-780 nm, perceived nearby Planck's black body radiators having temperatures of about 1000 K and above.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily on scale.

DETAILED DESCRIPTION OF THE EMBODIMENTS

A light emitting device according to the invention may be used in applications including but not being limited to a lamp, a light module, a luminaire, a spot light, a flash light, a projector, a (digital) projection device, automotive lighting such as e.g. a headlight or a taillight of a motor vehicle, arena lighting, theater lighting and architectural lighting.

Light sources which are part of the embodiments according to the invention as set forth below, may be adapted for, in operation, emitting light with a first spectral distribution. This light is subsequently coupled into a light guide or waveguide; here the light transmissive body. The light guide or waveguide may convert the light of the first spectral distribution to another spectral distribution and guides the light to an exit surface.

Figure 1A:
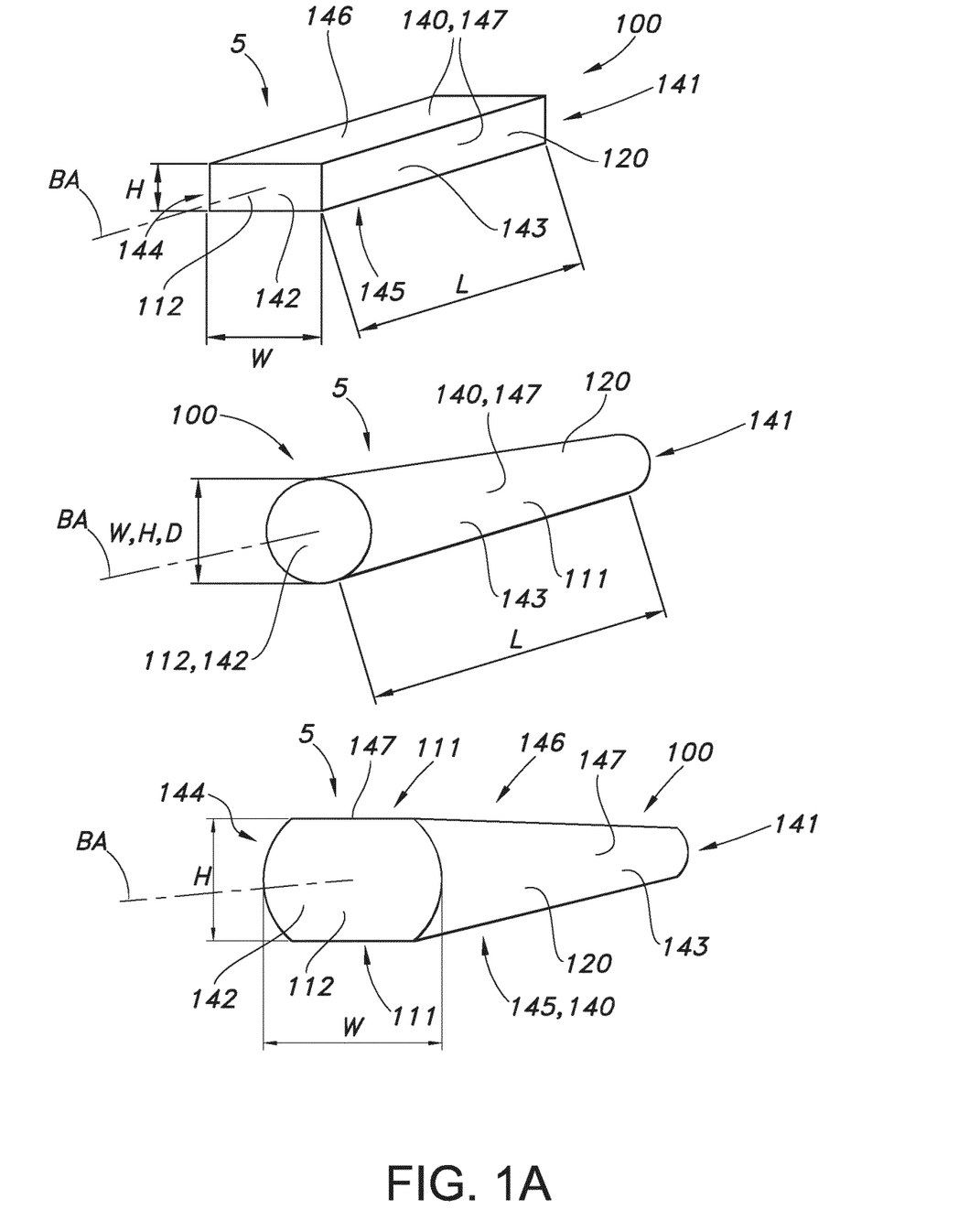
FIGS. 1a-1b schematically depict some aspects of the invention.

FIG. 1a schematically depicts some embodiments of possible bodies, such as ceramic bodies or crystals as waveguides. The faces are indicated with references 141-146. The first variant, a plate-like or beam-like light transmissive body has the faces 141-146. Light sources, which are not shown, may be arranged at one or more of the faces 143-146 (general indication of the edge faces is reference 147). The second variant is a tubular rod, with first and second faces 141 and 142, and a circumferential face 143. Light sources, not shown, may be arranged at one or more positions around the light transmissive body. Such light transmissive body will have a (substantially) circular or round cross-section. The third variant is substantially a combination of the two former variants, with two curved and two flat side faces. Especially, the body has a cross-section deviating from round (see first and third variant).

In the context of the present application, a lateral surface of the light guide should be understood as the outer surface or face of the light guide along the extension thereof. For example in case the light guide would be in form of a cylinder, with the first base surface at one of the ends of the light guide being constituted by the bottom surface of the cylinder and the second base surface at the other end of the light guide being constituted by the top surface of the cylinder, the lateral surface is the side surface of the cylinder. Herein, a lateral surface is also indicated with the term edge faces or side 140.

The variants shown in FIG. 1a are not limitative. More shapes are possible; i.e. for instance referred to WO2006/054203, which is incorporated herein by reference. The ceramic bodies or crystals, which are used as light guides, generally may be rod shaped or bar shaped light guides comprising a height H, a width W, and a length L extending in mutually perpendicular directions and are in embodiments transparent, or transparent and luminescent. The light is guided generally in the length L direction. The height H is in embodiments <10 mm, in other embodiments <5 mm, in yet other embodiments <2 mm. The width W is in embodiments <10 mm, in other embodiments <5 mm, in yet embodiments <2 mm. The length L is in embodiments larger than the width W and the height H, in other embodiments at least 2 times the width W or 2 times the height H, in yet other embodiments at least 3 times the width W or 3 times the height H. Hence, the aspect ratio (of length/width) is especially larger than 1, such as equal to or larger than 2, such as at least 5, like even more especially in the range of 10-300, such as 10-100, like 10-60, like 10-20. Unless indicated otherwise, the term "aspect ratio" refers to the ratio length/width. FIG. 1a schematically depicts an embodiment with four long side faces, of which e.g. two or four may be irradiated with light source light.

The aspect ratio of the height H:width W is typically 1:1 (for e.g. general light source applications) or 1:2, 1:3 or 1:4 (for e.g. special light source applications such as headlamps) or 4:3, 16:10, 16:9 or 256:135 (for e.g. display applications). The light guides generally comprise a light input surface and a light exit surface which are not arranged in parallel planes, and in embodiments the light input surface is perpendicular to the light exit surface. In order to achieve a high brightness, concentrated, light output, the area of light exit surface may be smaller than the area of light input surface. The light exit surface can have any shape, but is in an embodiment shaped as a square, rectangle, round, oval, triangle, pentagon, or hexagon.

Note that in all embodiments schematically depicted herein, the radiation exit window is especially configured perpendicular to the radiation input face(s). Hence, in embodiments the radiation exit window and radiation input face(s) are configured perpendicular. In yet other embodiments, the radiation exit window may be configured relative to one or more radiation input faces with an angle smaller or larger than 90°.

Note that, in particular for embodiments using a laser light source to provide light source light, the radiation exit window might be configured opposite to the radiation input face(s), while the mirror 21 may consist of a mirror having a hole to allow the laser light to pass the mirror while converted light has a high probability to reflect at mirror 21. Alternatively or additionally, a mirror may comprise a dichroic mirror.

Figure 1B:
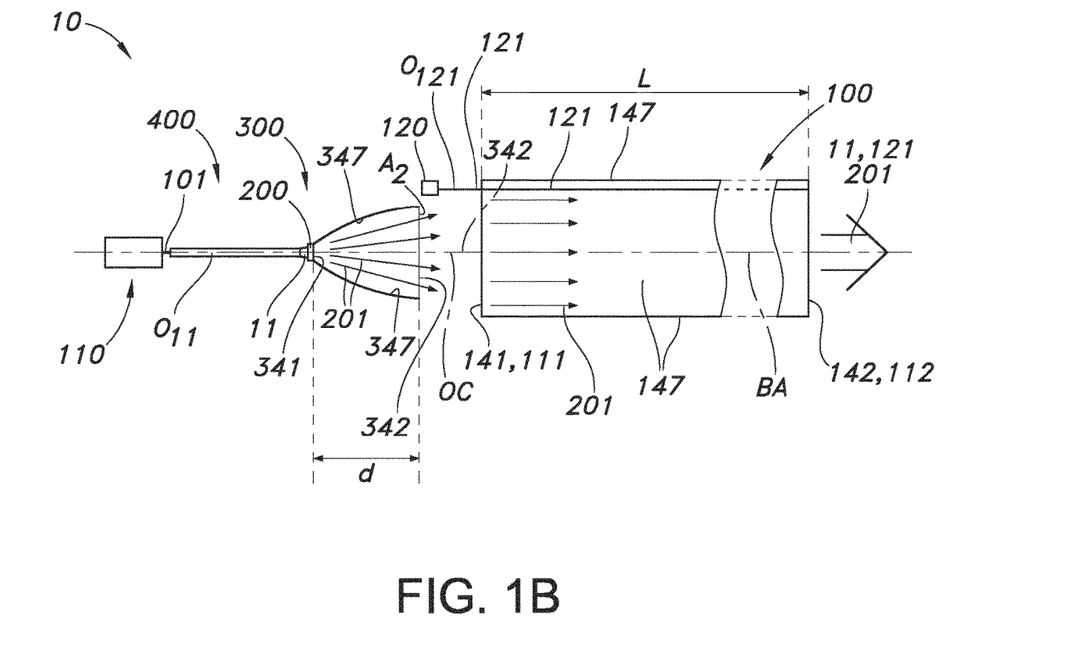

FIG. 1b schematically depicts an embodiment of a lighting device 10. The lighting device comprises a first light source 110 configured to provide first light source light 101, especially a laser light source. The first light source light 101 may have an optical axis $O_{11}$. Further, the device 10 comprises a luminescent material 200 configured to convert at least part of the first light source light 101 into luminescent material light 201. The device 10 further comprises a beam shaping optical element 300 having a light entrance side 341 and a light exit side 342, and a wall 347 bridging a distance d between the light entrance side 341 and the light exit side 342 of the beam shaping optical element 300, wherein at least part of the wall 347 is reflective for the luminescent material light 201, wherein the beam shaping optical element 300 is configured to receive at least part of the luminescent material light 201 at the light entrance side 341 and to provide beam shaped luminescent material light 201 at the light exit side 342. The beam shaping element may be a CPC like collimator. The beam shaping element 300 may have an optical axis $O_C$. Reference $A_2$ indicates (the area of) the light exit side 342 of the beam shaping optical element 300.

The device 10 yet further comprises an elongated light transmissive body 100, such as a ceramic or a crystal, having a first face 141 and a second face 142 defining a length L of the light transmissive body 100, and having one or more side faces 147 bridging the length L between the first face 141 and the second face 142, the light transmissive body 100 comprising a radiation input face 111 and a first radiation exit window 112, wherein the first face 141 comprises the radiation input face 111 and wherein the second face 142 comprises the first radiation exit window 112, wherein the radiation input face 111 is configured to receive at least part of the beam shaped light luminescent material light 201. Luminescent material light 201 propagates through the body 100 to the light exit side 342 and escapes therefrom.

The device 10 further comprises second light source 120 configured to provide second light source light 121 having a second spectral distribution. The second light source 120 is especially also a laser light source. The second light source light may have an optical axis $O_{121}$. The optical axes of the first light source light 101, the second light source light 121 and the beam shaping element 300 as well as the body axis BA of the light transmissive body 100 are essentially parallel. Advantage of such a configuration is that it reduces the angular distribution of the light that exits the light transmissive body 100. At the exit of the light transmissive body 100 the spatial uniformity is improved, as the incident angle of the light relative to the side face 147 when entering the light transmissive body 100 is reduced. A relatively narrow exit beam of the light is advantageous for a number of applications, such as for digital projection, spot lights and automotive head lights. In addition, it allows to reduce the size of the lighting system that comprises a lighting device according to the invention. In specific embodiments, the optical axes of the light source light 101, the beam shaping element 300 and a body axis BA of the light transmissive body 100 are essentially in line with each other (over at least part of their lengths coincide).

An optical axis is an imaginary line that defines the path along which light propagates through an element, and is usually parallel to the axis of symmetry. For an optical fiber, the optical axis is also known as the fiber axis.

The wording "essentially parallel" means that the deviation from parallelism is less that 15 degrees. Preferably, the deviation from parallelism is less than 10 degrees. More preferably, the deviation from parallelism is less than 5 degrees. Even more preferably, the deviation from parallelism is zero degrees.

Figure 2A:
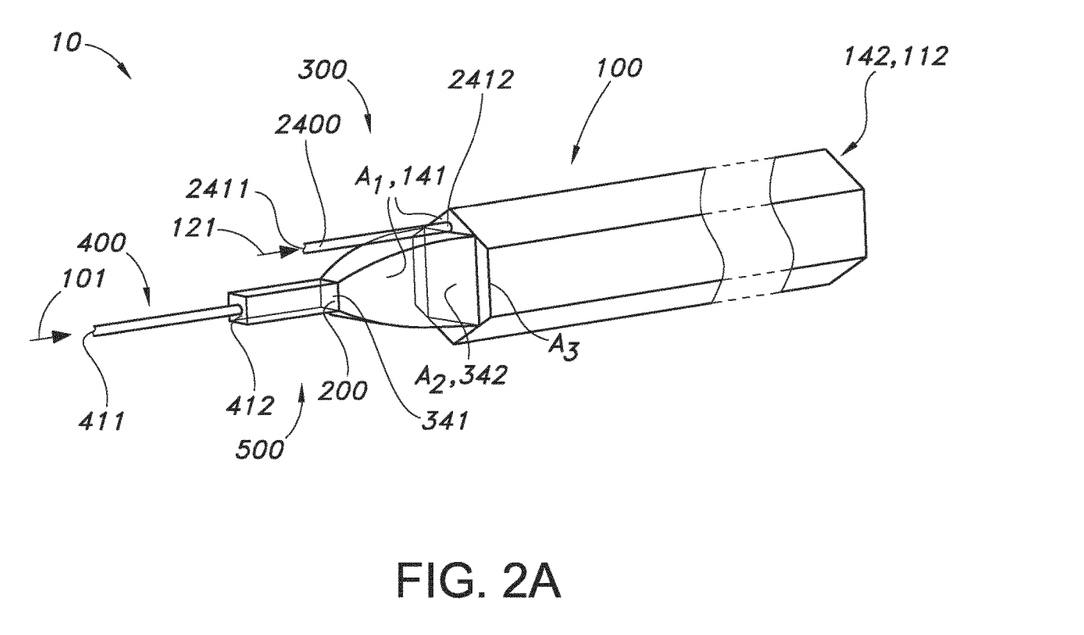
FIGS. 2a-2d schematically depict some embodiments.

The elongated light transmissive body 100 is configure to receive at least part of the second light source light 121 via one or more of (i) incoupling of the second light source light 121 via the wall 347 of the beam shaping optical element 300, (ii) incoupling of the second light source light 121 via part of the first face 141 of the elongated light transmissive body 100, and (iii) incoupling of the second light source light 121 via part of the of the one or more side faces 147 of the elongated light transmissive body 100. FIGS. 1b and 2a schematically depict the embodiment of incoupling of the second light source light 121 via part of the first face 141 of the elongated light transmissive body 100.

The lighting device 10 is especially configured to provide lighting device light 11 emanating from the first radiation exit window 112, wherein the lighting device light 11 comprises one or more of the at least part of the luminescent material light 201 and at least part of the second light source light 121.

FIG. 1b also schematically depicts an embodiment wherein the device 10 further comprises an optical fiber 400, configured to receive at one fiber side 411 the first light source light 101. A second side of the fiber 412 is optically coupled to the luminescent material 341 of the beam shaping optical element 300. The optical fibers 411 and/or 412 may especially be used to provide a broader beam shape than provided by the laser light sources 110 and/or 120, respectively, such as by micro-optical structures at the end of the fiber, e.g. surface roughness.

As indicated above, FIG. 2a (also) shows an embodiment wherein incoupling of the second light source light 121 is done via part of the first face 141 of the elongated light transmissive body 100. Here, it is further shown that the first face 141 may comprise a first area A1 being larger than a second area A2 of the light exit side 342 of the beam shaping optical element 300. Thereby, a remaining area A3 of the first face 141 is defined, and wherein the second light source 120 is optically coupled to the remaining area A3 for incoupling of the second light source light 121 via part of the first face 141 of the elongated light transmissive body 100.

Here, by way of example the elongated light transmissive body 100 has a hexagonal cross-section.

Reference 500 indicates an optional rod, such as for beam shaping. Laser light from the fiber can get a broader distribution (broader beam shape). In this way, the luminescent material may irradiated over a larger area.

Alternatively or additionally, other intermediate optical elements may be applied. Such intermediate optical element, like a positive or negative lens or a curved reflector or diffraction grating element may (also) provide some broadening of the beam. Especially, such elements may be configured downstream of the optical fiber (s) for providing a broader beam shape.

Figure 2B:
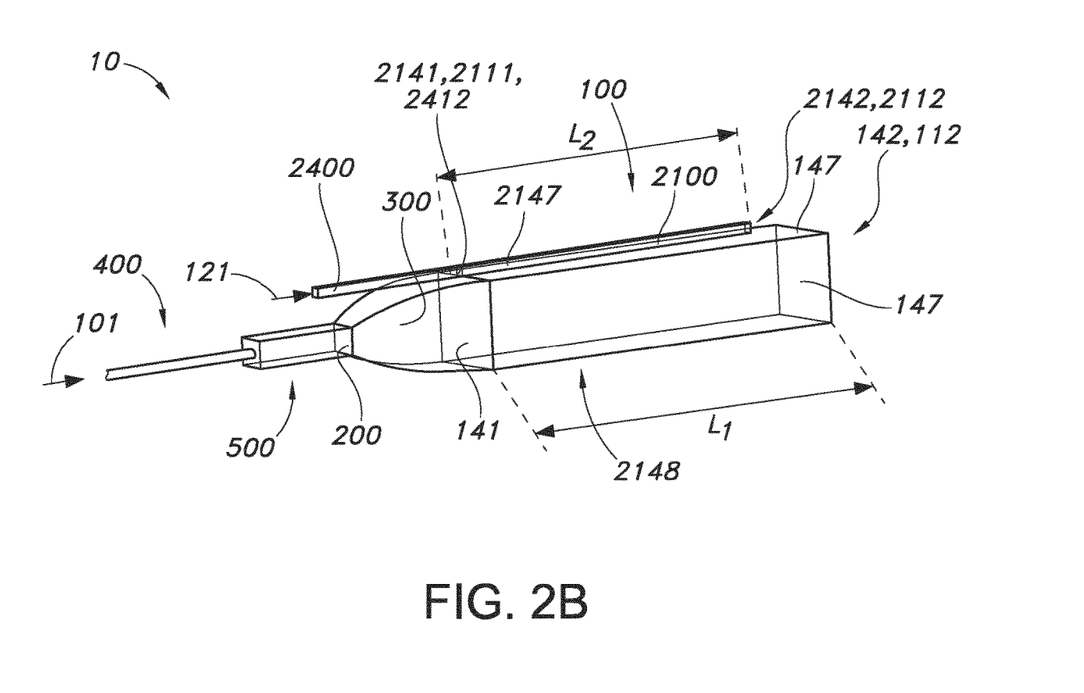

FIG. 2b schematically depicts an embodiment of the lighting device 10 which further comprises a second elongated light transmissive body 2100 having a first face 2141 of the second elongated light transmissive body 2100 and a second face 2142 of the second elongated light transmissive body 2100 defining a second length L2 of the second light transmissive body 2100.

The second elongated body 2100 has one or more side faces 2147 of the second elongated light transmissive body 2100 bridging the second length L2 between the first face 2141 of the second elongated light transmissive body 2100 and the second face 2142 of the second elongated light transmissive body 2100.

The second light transmissive body 2100 comprises a radiation input face 2111 of the second elongated light transmissive body 2100 and a first radiation exit window 2112 of the second elongated light transmissive body 2100.

The first face 2141 of the second elongated light transmissive body 2100 comprises the radiation input face 111 of the second elongated light transmissive body 2100 and at least one of the one or more side faces 2147 of the second elongated light transmissive body 2100 comprises the first radiation exit window 112. The radiation input face 2111 of the second elongated light transmissive body 2100 is configured to receive at least part of the second light source light 121. A first part 2148 the at least one of the one or more side faces 2147 of the second elongated light transmissive body 2100 is optically coupled to one or more side faces 147 of the elongated light transmissive body 100, for incoupling of the second light source light 121 via part of the first face 141 of the elongated light transmissive body 100.

The second length L2 can be identical or can be smaller than the first length. At the second face 2142 a mirror may be configured.

Figure 2C:
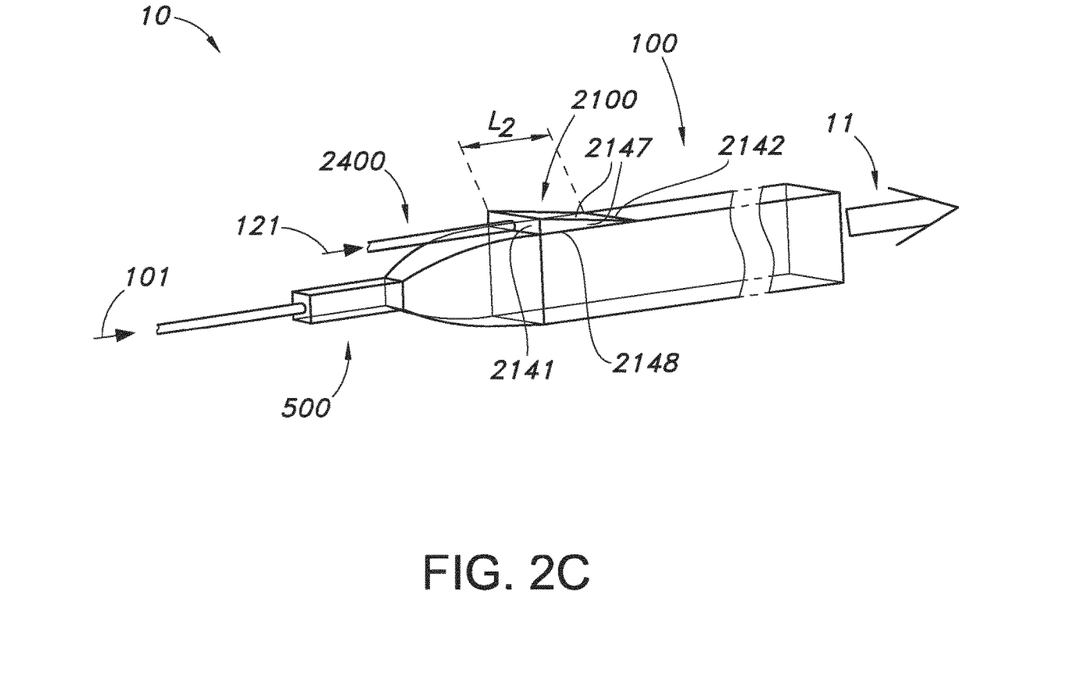

FIG. 2b (and also FIGS. 2c-2d) also shows an embodiment wherein a second optical fiber 2400 is applied. This second optical fiber 2400 may have a function analogous to the first optical fiber 400, but then in relation to the second light source light 121 (of the second light source). The second optical fiber 2400 is especially configured to receive at a first fiber side 2411 of the second optical fiber 2400 the second light source light 121. A second side 2412 of the second optical fiber 2400 is optically coupled to one or more of (i) the wall 347 of the beam shaping optical element 300 (see FIG. 2d), (ii) the part of the first face 141 of the elongated light transmissive body 100 (FIG. 2a), and (iii) the part of the of the one or more side faces 147 of the elongated light transmissive body 100 (FIGS. 2b and 2c). The fibers 400, 2400 may in embodiments have an essentially round cross-section, though other options may also be possible.

FIG. 2c schematically depicts an embodiment with a slanted face. In such embodiment, the second face 2142 and a side face 2147 are essentially the same (such as in especially size and shape). Hence, FIG. 2c shows an embodiment wherein the second elongated light transmissive body 2100 tapers over at least part of the second length L2 for facilitating coupling of the second light source light 121 into the elongated light transmissive body 100.

In FIG. 2b the width of the second elongated light transmissive body 2100 is essentially smaller than the width of the elongated body 100. However, this is not necessarily the case, see e.g. FIG. 2c. Further, also the embodiment of FIG. 2b may comprise in a variant a slanted face 2147 over at least part of its length L2.

Note that the second elongated light transmissive body 2100 may be a separate body, brought in optical contact with the first elongated light transmissive body 100, but may in embodiments may also a part of the body 100, with the elongated body and the second elongated light transmissive body 2100 produced as a single body.

Further, a combination of n second light sources and n second elongated light transmissive bodies 2100 may be provided, wherein n is at least 1, and may in embodiments be in the range of 1-12, such as 1-6.

Figure 2D:
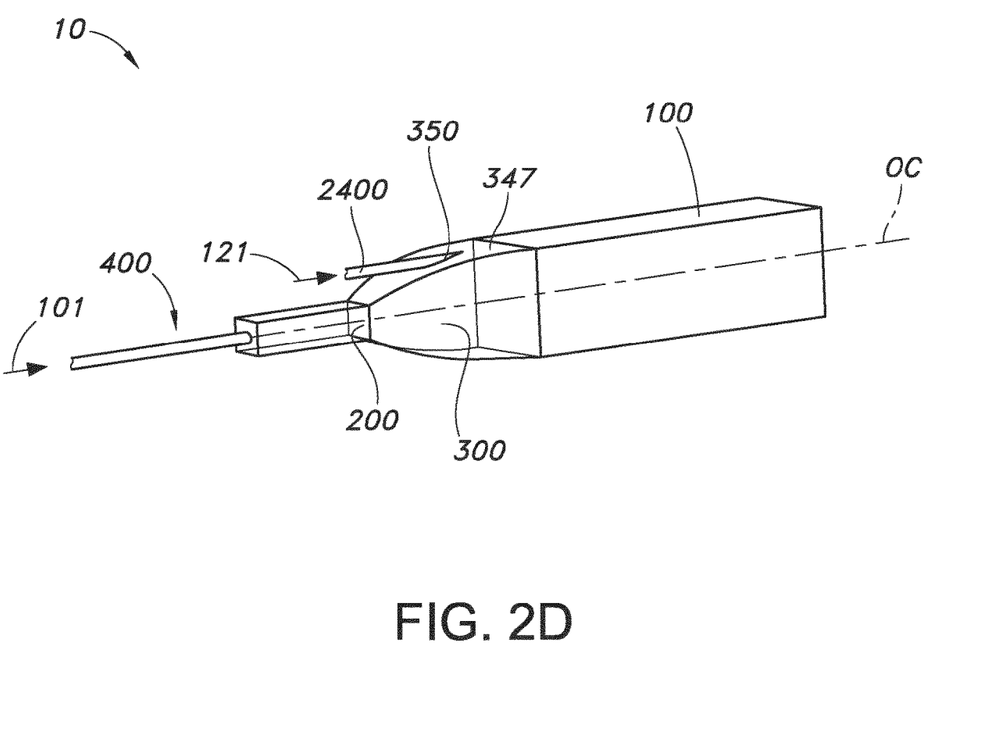

FIG. 2d schematically depicts an embodiment wherein the wall 347 of the beam shaping optical element comprises an opening 350 for receiving at least part of the second light source light 121 for incoupling of the second light source light 121 via the wall 347 of the beam shaping optical element 300.

Like in FIGS. 2b (and 2c) the area of the light exit side of the beam shaping optical element and the first face (more especially the radiation input face) may essentially be the same.

The four configurations in FIGS. 2a-2d were simulated and the maximum color error over the output area, expressed as delta-u'v' coordinates d_u'v', dimensionless], were calculated, as well as the gradient of the color variations with distance, in units of [delta-u'v'/meter]. This gradient number is important as a measure for the visibility of the color error, since this is determined by the absolute color error and the distance between points with different color. All four configurations behave relatively similarly. It was further noted that the performance can be improved by choosing longer mixing rods.

|  | Maximum color error d_u'v' | color error gradient [m-1] |
| --- | --- | --- |
| 2a: hexagonal | 0.040 | 23.6 |
| 2b: sub-rod | 0.031 | 20.5 |
| 2c: coupling prism | 0.033 | 19.4 |
| 2d: through collimator | 0.033 | 21.1 |

The term "substantially" herein, such as in "substantially all light" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. Where stated that an absorption, a reflection or a transmission should be a certain value or within a range of certain values these values are valid for the intended range of wavelengths.

The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to". The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

Practical designs may be further optimized the person skilled in the art using optical ray trace programs, such particular angles and sizes of microstructures (reflective microstructures or refractive microstructures) may be optimized depending on particular dimensions, compositions and positioning of the one or more elongated light transmissive bodies.

The invention further applies to a device comprising one or more of the characterizing features described in the description and/or shown in the attached drawings. The invention further pertains to a method or process comprising one or more of the characterizing features described in the description and/or shown in the attached drawings. The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A lighting device comprising:
a first light source configured to provide first light source light;
a luminescent material configured to convert at least part of the first light source light into luminescent material light;
a beam shaping optical element having a light entrance side and a light exit side, and a wall bridging a distance between the light entrance side and the light exit side, wherein at least part of the wall is reflective for the luminescent material light, wherein the beam shaping optical element is configured to receive at least part of the luminescent material light at the light entrance side and to provide beam shaped luminescent material light at the light exit side;
an elongated light transmissive body having a first face and a second face defining a length (L) of the light transmissive body, and having one or more side faces bridging the length (L) between the first face and the second face, the light transmissive body comprising a radiation input face and a first radiation exit window, wherein the first face comprises the radiation input face and wherein the second face comprises the first radiation exit window, wherein the radiation input face is configured to receive at least part of the beam shaped light luminescent material light;
a second light source configured to provide second light source light, wherein the second light source comprises a laser light source;
wherein:
the elongated light transmissive body is configured to receive at least part of the second light source light via one or more of (i) incoupling of the second light source light via the wall of the beam shaping optical element, (ii) incoupling of the second light source light via part of the first face of the elongated light transmissive body, and (iii) incoupling of the second light source light via part of the of the one or more side faces of the elongated light transmissive body; and
wherein the optical axis ($O_{11}$) of the first light source light, the optical ($O_C$) axis of the beam shaping element, the optical axis of the ($O_{121}$) of the second light source light and the body axis (BA) of the elongated light transmissive body are being essentially parallel to each other with a deviation from parallelism that is less than 15 degrees.

2. The lighting device according to claim 1, wherein the first light source comprises a laser light source.

3. The lighting device according to claim 1, further comprising an optical fiber, configured to receive at one fiber side the first light source light, and wherein a second side of the fiber is optically coupled to the luminescent material.

4. The lighting device according to claim 1, wherein the beam shaping optical element comprises a compound parabolic concentrator.

5. The lighting device according to claim 1, wherein the elongated light transmissive body has an aspect ratio of at least 5, and wherein the elongated light transmissive body comprises one or more of a polymeric material, a ceramic material, a glass material, and a single crystalline material.

6. The lighting device according to claim 1, wherein the first face comprises a first area (A1) being larger than a second area (A2) of the light exit side of the beam shaping optical element, thereby defining a remaining area (A3) of the first face, and wherein the second light source is optically coupled to the remaining area (A3) for incoupling of the second light source light via part of the first face of the elongated light transmissive body.

7. The lighting device according to claim 1, wherein the elongated light transmissive body has a hexagonal cross-section.

8. The lighting device according to claim 1, further comprising a second elongated light transmissive body having a first face of the second elongated light transmissive body and a second face of the second elongated light transmissive body defining a second length (L2) of the second light transmissive body, and having one or more side faces of the second elongated light transmissive body bridging the second length (L2) between the first face of the second elongated light transmissive body and the second face of the second elongated light transmissive body, wherein the second light transmissive body comprises a radiation input face of the second elongated light transmissive body and a first radiation exit window of the second elongated light transmissive body, wherein the first face of the second elongated light transmissive body comprises the radiation input face of the second elongated light transmissive body and at least one of the one or more side faces of the second elongated light transmissive body comprises the first radiation exit window, wherein the radiation input face of the second elongated light transmissive body is configured to receive at least part of the second light source light, and wherein a first part the at least one of the one or more side faces of the second elongated light transmissive body is optically coupled to one or more side faces of the elongated light transmissive body, for incoupling of the second light source light via part of the first face of the elongated light transmissive body.

9. The lighting device according to claim 8, wherein the second elongated light transmissive body tapers over at least part of the second length (L2) for facilitating coupling of the second light source light into the elongated light transmissive body.

10. The lighting device according to claim 1, wherein the wall of the beam shaping optical element comprises an opening for receiving at least part of the second light source light for incoupling of the second light source light via the wall of the beam shaping optical element.

11. The lighting device according to claim 3, wherein the optical axis of the optical fiber is essentially parallel to the optical axis of the first light source light with a deviation from parallelism that is less than 15 degrees.

12. The lighting device according to claim 1, further comprising a second optical fiber, configured to receive at a first fiber side of the second optical fiber the second light source light, and wherein a second side of the second optical fiber is optically coupled to one or more of (i) the wall of the beam shaping optical element, (ii) the part of the first face of the elongated light transmissive body, and (iii) the part of the of the one or more side faces of the elongated light transmissive body.

13. The lighting device according to claim 1, wherein the luminescent material is configured to provide one or more of green and yellow luminescent material light, and wherein the second light source is configured to provide one or more of blue and red second light source light.

14. The lighting device according to claim 1, comprising a plurality of second light sources comprising two or more second light sources configured to provide different second spectral distributions, differing with a difference in peak maxima of at least 20 nm.

15. A lighting system comprising the lighting device according to claim 1, wherein the lighting system comprises a spot lighting system or an image projection system.

* * * * *